US006829004B1

(12) United States Patent
Abe

(10) Patent No.: US 6,829,004 B1
(45) Date of Patent: Dec. 7, 2004

(54) FILM SCANNING SYSTEM

(75) Inventor: Tetsuya Abe, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/348,050

(22) Filed: Jul. 6, 1999

(30) Foreign Application Priority Data

Jul. 7, 1998 (JP) .......................................... 10-191292

(51) Int. Cl.[7] ............................................. H04N 9/47
(52) U.S. Cl. ........................................ 348/96; 348/373
(58) Field of Search ......................... 348/96, 373, 376; 358/505, 506

(56) References Cited

U.S. PATENT DOCUMENTS 5,655,164 A * 8/1997 Tsai ............................ 396/312
5,905,526 A * 5/1999 Sato ............................. 348/96

FOREIGN PATENT DOCUMENTS

| JP | 10-023196 | * | 1/1998 | ............ H04N/1/00 |
| JP | 10-112821 | * | 4/1998 | ............ H04N/5/253 |
| JP | 2000-013553 | * | 1/2000 | ............ H04N/1/00 |

* cited by examiner

Primary Examiner—Tuan Ho
Assistant Examiner—Gevell Selby
(74) Attorney, Agent, or Firm—Greenblum & Bernstein, P.L.C.

(57) ABSTRACT

A film scanning system for scanning an image formed on a film is provided with a digital camera having an image sensor, an image of an object being captured using the image sensor; and a scanner unit. The scanner unit is coupled with the digital camera when an image of the film is captured. The scanner unit has an original receiving portion, the film being located at the original receiving portion, an image formed on the film being captured by the image sensor of the camera.

4 Claims, 10 Drawing Sheets

FILM SCANNING SYSTEM

BACKGROUND OF THE INVENTION

The present invention relates to a film scanning system for scanning an image formed on a film.

Conventionally, a film scanning system for capturing an image (negative or positive) formed on a film and generating has been known. In a conventional film scanning system, a line sensor having a plurality of CCD's arranged in a line is provided for capturing a line image along a predetermined direction (i.e., a main scanning direction). In order to capture a two-dimensional image, the line sensor is moved relative to the film in a direction (i.e., an auxiliary scanning direction) which is perpendicular to the main scanning direction, which requires a considerable period of time.

SUMMARY OF THE INVENTION

It is therefore an object of the invention to provide an improved film scanning system, which is capable of capturing a two-dimensional image within a relatively short period of time.

For the above object, according to the present invention, there is provided a film scanning system for scanning an image formed on a film, which is provided with:

a digital camera having an image sensor, an image of an object being captured using the image sensor; and a scanner unit, the scanner unit being coupled with the digital camera when an image of the film is captured, wherein the scanner unit has an original receiving portion, the film being located at the original receiving portion, an image formed on the film being captured by the image sensor of the camera.

Since the image can be captured with use of the image sensor, the image can be scanned quickly.

Optionally, the film scanning device is provided with a controller that controls operation of the scanner unit, and wherein the digital camera is provided with a plurality of operable members, the controller controls operation of the film scanning system in accordance with operation of at least one of the plurality of operable members.

Since the operable members of the digital camera are also used for operation of the scanning system, the number of operation members to be provided on the scanner unit can be reduced.

Further, the plurality of operable members are exposed to outside when the digital camera is couple do the scanner unit.

Still optionally, the scanner unit is provided with a light source for illuminating the film, and wherein, upon operation of a predetermined one of the plurality of operable members of the digital camera, the controller turns ON the light source, captures an image formed on the film.

Preferably, the digital camera is provided with a display device which is capable of displaying the image captured by the scanner system.

Further optionally, the scanner unit is provided with a film feeding system for feeding the film, and wherein, the controller controls the feeding system to feed the film in accordance with operation of a predetermined one of the plurality of operable members of the digital camera.

Furthermore, the original receiving portion of the scanner unit is constituted to be exchangeable.

Yet optionally, the scanner is provided with a mechanism for detachably securing the digital camera to the scanner unit, and a connecting system for electrically connecting the digital camera with the scanner unit.

In a particular case, the mechanism includes a tripod socket provided on a surface of the digital camera, and a screw to be engaged with the tripod socket provided to the scanner unit.

Preferably, the scanning system is capable of storing image data of a captured image in either a memory of the digital camera or an auxiliary memory, and wherein one of the memory of the digital camera and the auxiliary memory is selected by operating one of the plurality of operable members.

Furthermore, functions of the plurality of operable members when the digital camera is used alone are different from those when the digital camera is coupled to the scanner unit and operate a part of the scanning system. Thus, even if the operable members of the digital camera are used for operating the scanning system, the number of the operable members of the digital camera will not be increased.

Still optionally, the scanner unit may be provided with a close-up lens to be located between the film and a photographing optical system of the digital camera.

According to another aspect of the invention, there is provided a film scanning system for scanning an image formed or a film, which is provided with a digital camera and a scanner unit.

The digital camera includes: an image sensor for capturing an image; a plurality of operable member; and a first controller for controlling operation of the digital camera in accordance with operation of the plurality of operable members; and the scanner unit includes: an illuminating system for illuminating an original located at an image reading area of the scanner unit; a feeding system for feeding the original to locate a desired one of a plurality of images formed on the original at the image reading area; and a second controller for controlling operation of the illuminating system and the feeding system. The scanner unit is coupled with the digital camera when an image on the original is captured, and when the digital camera is coupled to the scanner unit, the first controller and the second controller communicated so that the second controller controls the illuminating system and the feeding system to operate in accordance with operation of the plurality of operable members of the digital camera.

Optionally, the scanner unit further provided with:

a original detection system that detects whether an original is loaded in the scanner unit;

a camera detection system that detects whether the digital camera is electrically coupled to the scanner unit; and an indicating system that indicates whether the original is loaded and the digital camera is electrically connected to the scanner unit.

BRIEF DESCRIPTION OF THE ACCOMPANYING DRAWINGS

DESCRIPTION OF THE EMBODIMENTS

Hereinafter, the present invention will be described with reference to the accompanying drawings.

Figure 1:
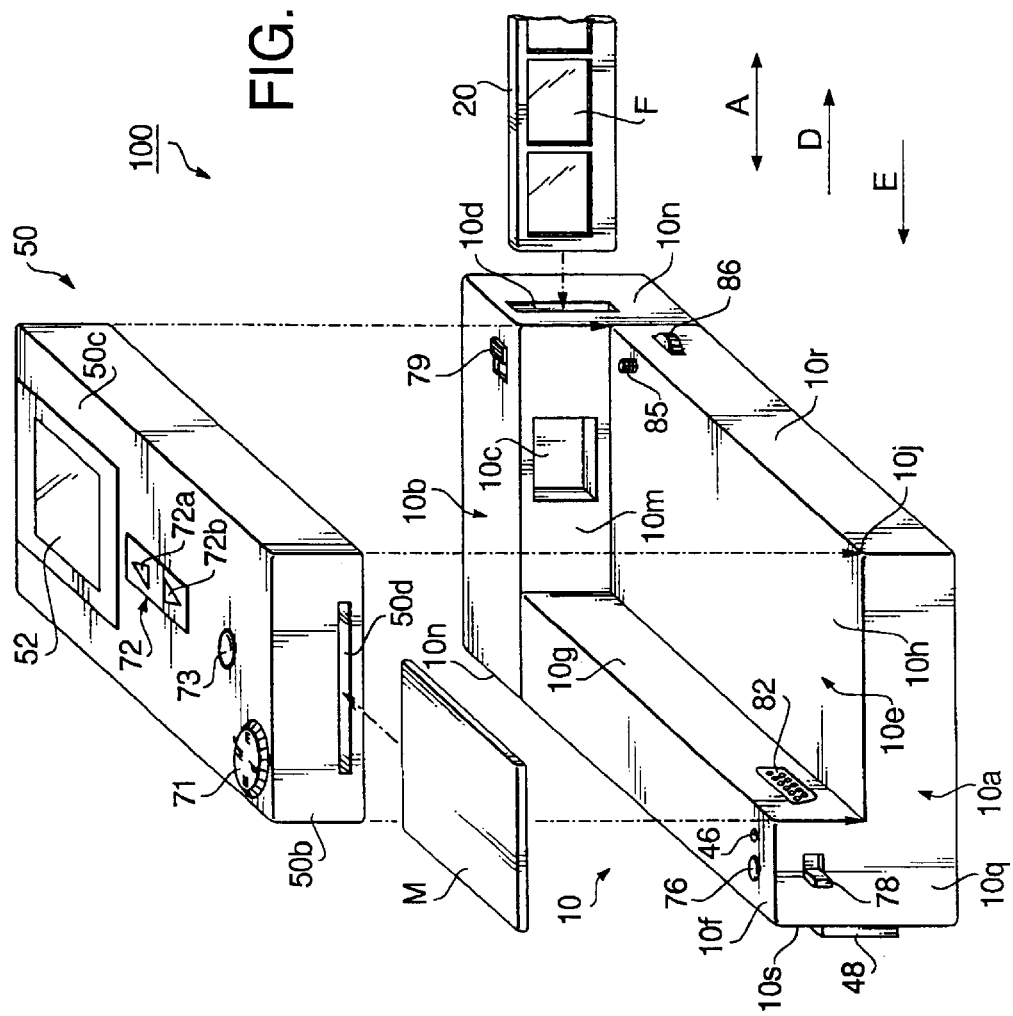
FIG. 1 is a perspective view of a scanning system including a scanner unit and a digital camera, when the digital camera is detached from the scanner unit.

FIG. 1 is a perspective view of a scanning system 100 according to an embodiment of the present invention. The scanning system 100 includes a scanner unit 10 and a digital camera 50. The scanner unit 10 is constituted such that the digital camera 50 can be detachably coupled thereto. In FIG. 1, the digital camera 50 is detached from the scanner unit 10, while in FIG. 2, the digital camera 50 is coupled to the scanner unit 10.

Figure 3:
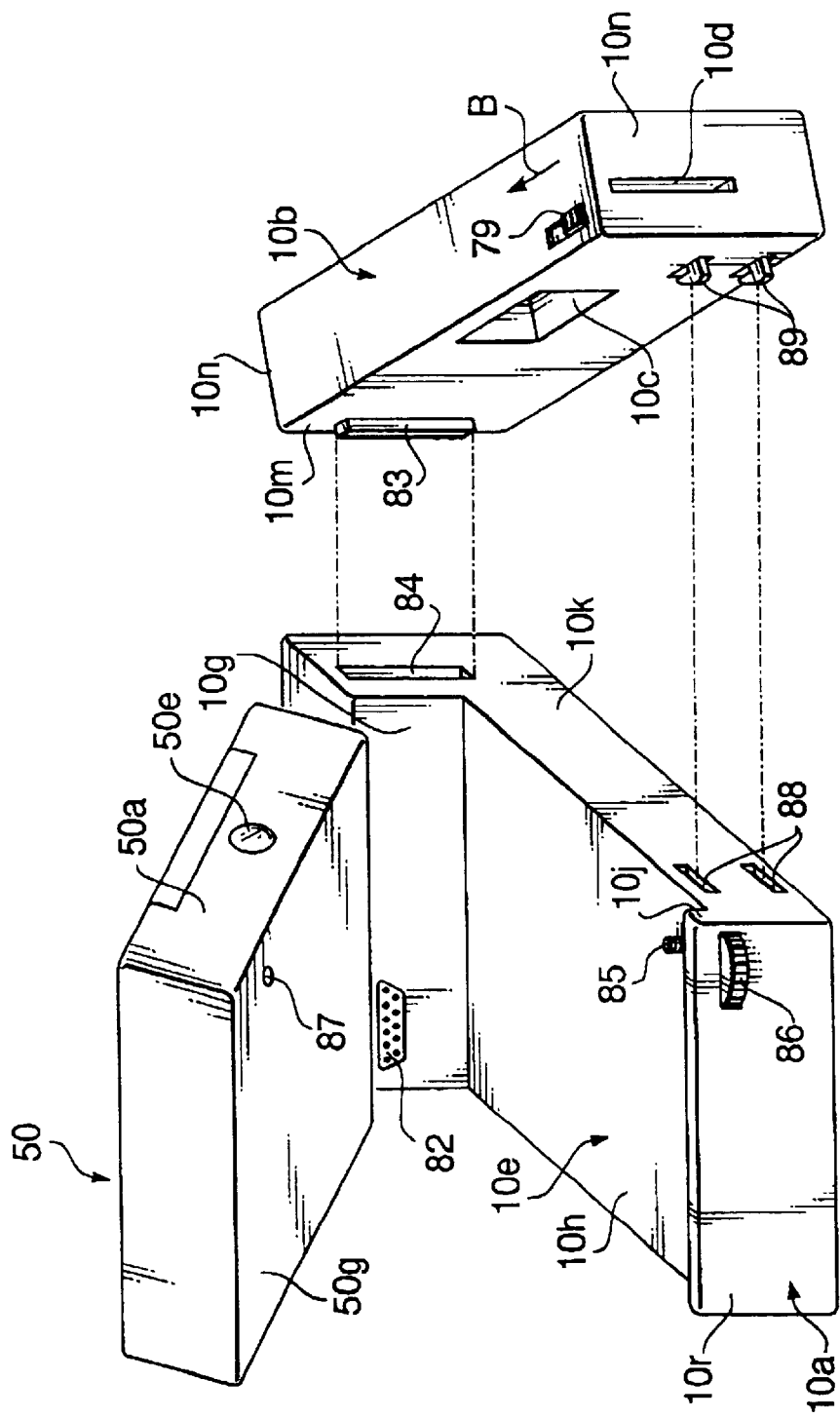
FIG. 3 is an exploded perspective view of the scanning system.

FIG. 3 is an exploded perspective view of the scanning system 100. As shown in FIG. 3, the scanner unit 10 consists of a control unit 10a and an original receiving unit 10b.

Figure 4:
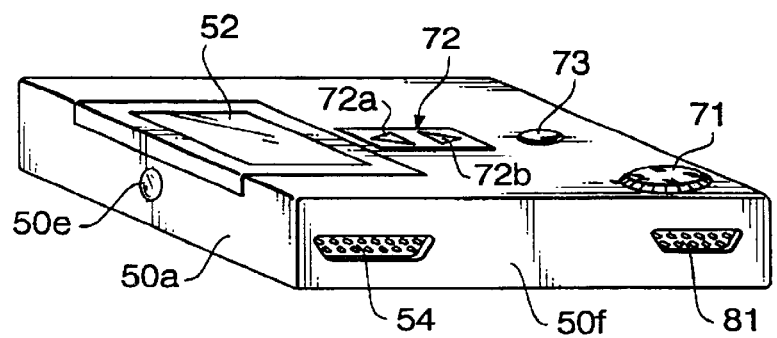
FIG. 4 is a perspective view of the digital camera.
Figure 5:
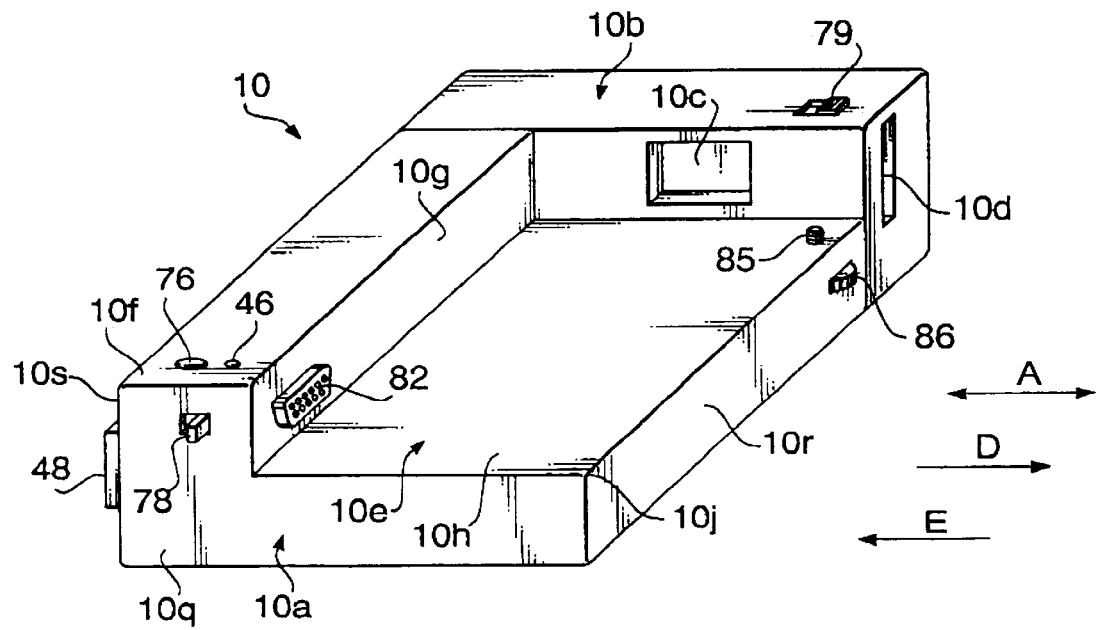
FIG. 5 is a perspective view of the scanner unit.

FIG. 4 is a perspective view of the digital camera 50, and FIG. 5 is a perspective view of the scanner unit 10.

The scanner unit 10 is used for capturing images formed on a film F using the digital camera 50. It should be noted that the digital camera 50 can be used alone as a generally known digital camera for capturing images of various objects such as people, scenery and the like, without the scanner unit 10. When the digital camera 50 is coupled to the scanner unit 10, the images formed on the film F can be captured by the digital camera 50.

The original receiving unit 10b is capable of illuminating the film F loaded therein, and feeding the same. Operation of the original receiving unit 10b is controlled by a control system provided in the control unit 10a in accordance with the operation of operable switches of the digital camera 50.

As described above, the original receiving unit 10b can be detachably coupled to the control unit 10a. As shown in FIG. 3, a surface 10m of the original receiving unit 10b and a surface 10k of the control unit 10a contact with each other when the control unit 10a and the original receiving unit 10b are coupled. On the surface 10m, hook members 89 and 89 are provided, which are inserted in socket portions 88 and 88 on a surface 10k, respectively.

The hook members 89 and 89 are movable in association with movement of a slide member 79. Specifically, be inserting the hook member 89 and 89 in the socket portions 88 and 88, and moving the slide member 79 in a direction indicated by arrow B, the original receiving unit 10b is mechanically engaged with the control unit 10a. By moving the slide member 79 in the opposite direction, the original receiving unit 10b can be detached from the control unit 10a.

On the surface 10m, a protruded connector 83 is provided, and on the surface 10k, another connector (a recessed connector) 84 is provided. When the original receiving unit 10b is coupled to the control unit 10a, the connector 83 is fitted in and connected to the connector 84. When the connectors 83 and 84 are connected, the control unit 10a and the original receiving unit 10b are electrically connected.

Figure 2:
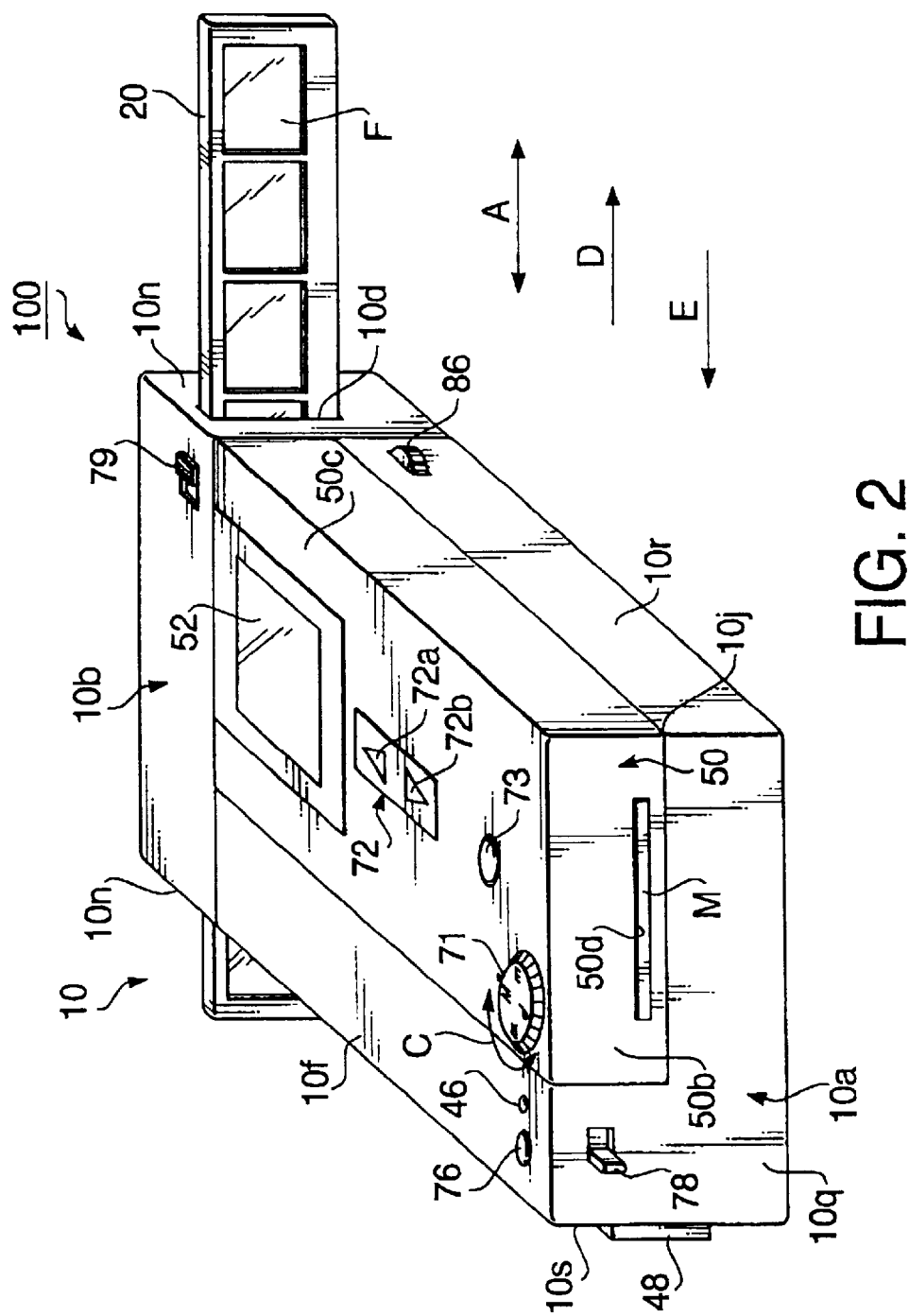
FIG. 2 is a perspective view of the scanning system when the digital camera is coupled to the scanner unit.

Between surfaces 10n and 10n next to the surface 10m of the original receiving unit 10b, an opening 10d is formed through the original receiving unit 10b. As shown in FIGS. 1 and 2, a holder 20 which holds a film F to be scanned is inserted in the opening 1d. The film F can be either a negative or positive transparent-type image.

It should be noted that the constitution and shape of the original receiving unit 10b may be different depending on a film F to be held. Accordingly, in the embodiment, the original receiving unit 10b is constituted to be detachable from the control unit 10a, and is to be replaced with a suitable unit which can also be coupled to and electrically connects the control unit 10a. If only one type of holder is used, the control unit 10a and the original receiving unit 10b may be formed unitarily as a single unit.

As shown in FIGS. 1, 3 and 5, at a central portion on the surface 10m, a window 10c is formed. When the digital camera 50 is coupled to the scanner unit 10, the image formed on the film F is scanned by the digital camera 50 through the window 10c.

The digital camera 50 is provided with a two-dimensional image sensor such as a CCD for capturing a two-dimensional image at a time. As shown in FIGS. 1 and 2, an LCD (Liquid Crystal Display) 52 is provide on a top surface 50c thereof. On a front surface 50a (see FIG. 4), a light receiving window 50e is formed for allowing light to be incident on the photographing lens 56 (see FIG. 9) of the digital camera 50, thereby an image is formed on the image sensor.

On a rear surface 50b (se FIG. 1 or 2), a card slot 50d is formed. Through the card slot 50d, a card-shaped memory M for storing image data is inserted.

As described above, the LCD 52 is provided on the top surface 50c of the digital camera 50. Further, on the top surface 50c, a mode selection dial 71 for selecting an operation mode of the digital camera 50, a zooming panel 72 provided wish an UP button 72a and a DOWN button 72b, and a release button 73 for capturing an image and storing image data are provided.

On a side surface 50f of the digital camera 50, which contacts the control unit 10a (see FIG. 4), a connector 81 for electrically connecting the digital camera 50 to the control unit 10a is provided. Further, on the surface 50f, another connector 54 for connecting the digital camera 50 to an auxiliary device such as a computer is provided. On a lower surface 50g (see FIG. 3), a tripod socket (i.e., a threaded hole) 87 is provided. The tripod socket 87 is used for mounting the digital camera 50 on a tripod. In the present embodiment, the tripod socket 87 is used for securing the digital camera 50 on the scanner unit 10.

As shown in FIG. 5, the scanner unit 10 is formed with a dropped portion 10e. One end side of a surface 10h of the dropped portion 10e is formed to be a lifted edge 10j which prevents the digital camera 50 mounted on the surface 10h from sliding in direction A. Further, on the surface 10h, a screw 85 to be engaged with the tripod socket 87 of the digital camera 50 is provided. On a side surface 10r of the dropped portion 10e, a dial 86 for rotating the screw 85 is provided. By placing the digital camera 50 on the surface 10h and rotating the dial 86, the screw 85 is engaged with the tripod socket 87.

On a vertical surface 10g at the dropped portion 10e, a connector 82 to be engaged with the connector 81 of the digital camera 50 is provided. The connector 82 is movable in direction A. On a rear surface 10q of the control unit 10a, a connection lever 78 is provided. The connection lever 78 is slidable in direction A, and the connector 82 moves in association with the movement of the connection lever 78.

As shown in FIG. 1, when the connection lever 78 is located on a left-hand side, the connector 82 is not protruded from the surface 10g, i.e., the end surface of the connector 82 is substantially on the same plane of the surface 10g. When the connection lever 78 is moved rightward (see FIG. 5), the connector 82 is protruded from the surface 10g.

When the digital camera 50 is placed at the dropped portion 10e (i.e., on the surface 10h) and the dial 86 is rotated, the digital camera 50 is mechanically secured to the scanner unit 10. Further, by moving the lever 78 as shown in FIG. 5, the protruded connector 82 is fitted in the recessed connector 81 (see FIG. 4) of the digital camera 50, thereby the digital camera 50 is electrically connected to the control unit 10a.

As shown in FIG. 2, when the digital camera 50 is mounted on the scanner unit 10, the mode selection dial 71, the zooming panel 72 and the release button 73 are exposed to outside and are operable. Further, the LCD 52 is also exposed to outside, and thus, an operator is able to monitor the images displayed thereon. Furthermore, the card slot 50d is also exposed to outside so that the card-shaped memory M can be inserted/removed.

On the top surface 10f of the control unit 10a, a standby switch 76 is provided. Upon operation of the standby switch 76, the scanner unit 10a is brought in standby condition for scanning. Closely adjacent to the standby switch 76, an indicator lamp 46 for indicating a connection status of the digital camera 50 and the scanner unit 10, and a film loading status. The indicator lamp 46 includes yellow, green and red LED's (Light Emitting Diodes) which are selectively lit to indicate a plurality of status.

On a side surface 10s, a connector 48 is provided. An auxiliary devices such as a computer can be connected through the connector 48.

Scanning operation is executed with the digital camera 50 being connected with the scanner unit 10. Operation of the scanner unit, i.e., illuminating and feeding of the film F can be controlled by operating the operable members of the digital camera 50, i.e., by the mode selection dial 71, the UP button 72a, the DOWN button 72b, and the release button 73.

Operation of the mode selection dial 71, the UP button 72a, the DOWN button 72b, and the release button 73 will be described.

Figure 6:
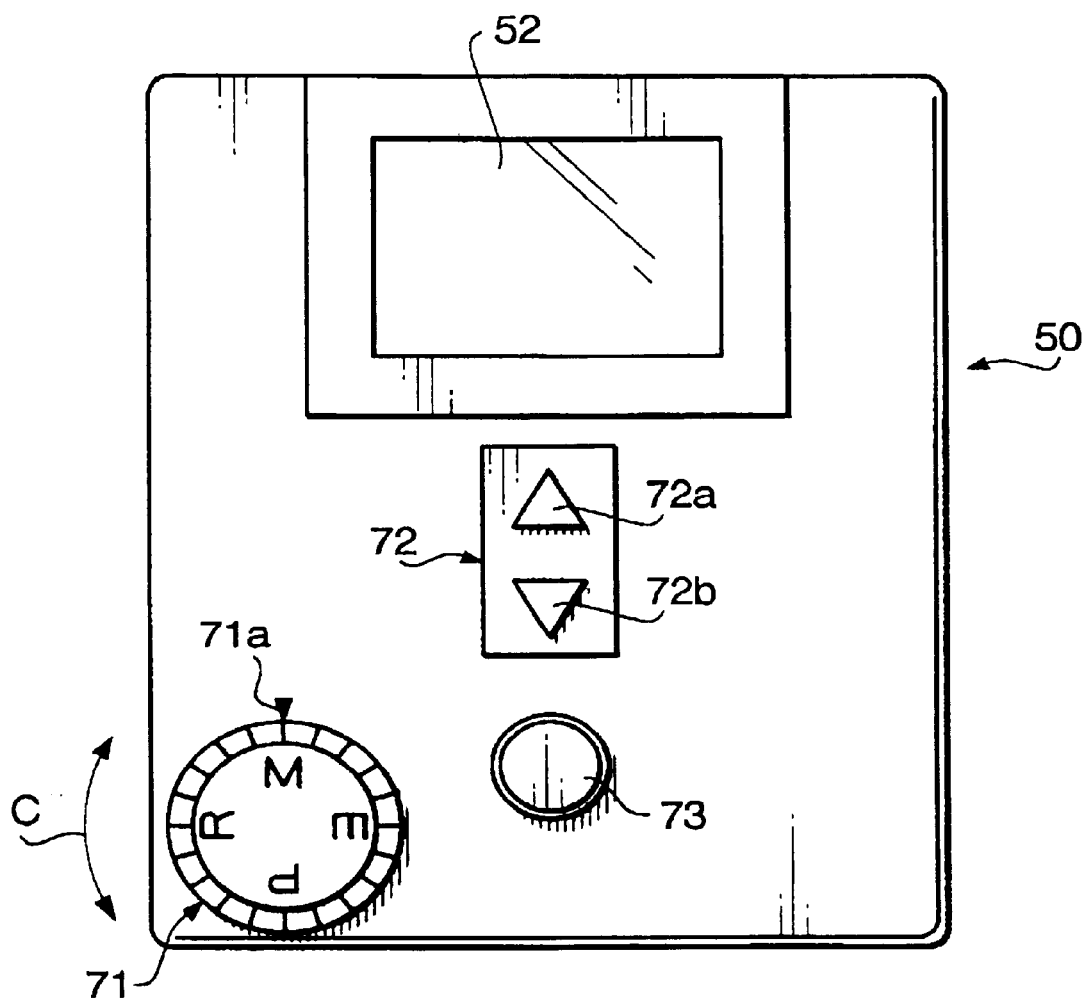
FIG. 6 is a front view of the digital camera.

As shown in FIG. 6, which is a top view of the digital camera 50, on the mode selection dial 71, letters M, R, P and E are formed. Letter M represents a recording medium selection mode, letter R represents a recording mode, letter P represents a play (reproduction) mode, and letter E represents an erasure mode. By rotating the mode selection dial 71 and located one of the letters M, R, P and E at an index 71a, the mode is selected as the operation mode of the digital camera 50.

Firstly, the mode selection when the digital camera 50 is used without being coupled to the scanner unit 10 is described.

When the letter M of the mode selection dial 71 is located at the index 71a, the digital camera 50 operates in the recording medium selection mode. In the recording medium selection mode, the operator is able to select a recording medium in which the image data is stored.

Figure 7:
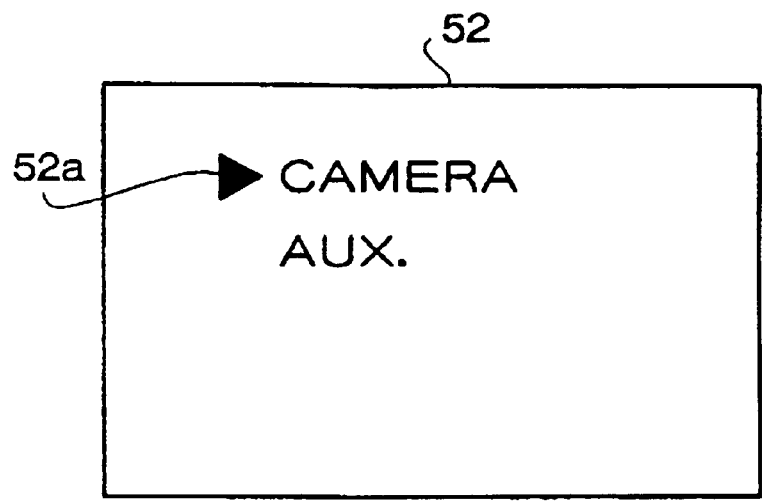
FIG. 7 shows a display screen of an LCD (Liquid Crystal Display) when the scanning system, which includes the scanning unit and the digital camera, operates in a recording media selection mode.

When the digital camera 50 operates in the recording medium selection mode, an image shown in FIG. 7 is displayed on the LCD 52. In this example, one of "CAMERA" or "AUX." can be selected. "CAMERA" represents the card memory M inserted in the digital camera 50, and "AUX." represents a recording medium of an auxiliary device such as a computer connected to the digital camera 50 through the connector 54. By operating the UP button 72a or DOWN button 72b, a pointer 52a is moved to point "CAMERA" or "AUX.", and then by depressing the release button 73, the pointed medium is selected. In FIG. 7, by depressing the DOWN button 72b, the pointer 52a moves downward. Thereafter, if the UP button 72a is depressed, the pointer 52a moves upward and points "CAMERA".

When the letter R of the mode selection dial 71 is located at the index 71a, the digital camera 50 operates in the recording mode. In the recording mode, by operating the UP button 72a and the DOWN button 72b, a photographing lens 56 (see FIG. 9), which is a zoom lens, is driven to move to change the image magnification. When the release button 73 is depressed, an object image is captured, and image data thereof is stored in the recording medium which was determined when the digital camera 50 operates in the mode selection mode.

When the letter P of the mode selection dial 71 is located at the index 71a, the digital camera 50 operates in the reproduction mode. In the reproduction mode, images stored in the image memory M, are displayed on the LCD 52.

Figure 8:
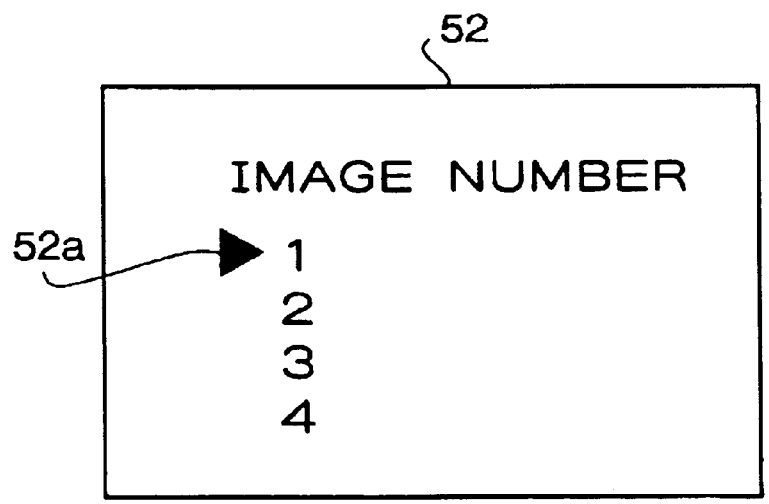
FIG. 8 shows a display screen of the LCD when the scanning system operates in an image selection mode.

Specifically, when the digital camera 50 operates in the reproduction mode, an image as shown in FIG. 8 is displayed on the LCD 52. The displayed numerals 1, 2, 3 and 4 each represents an image number of an image stored in the memory M. By locating the pointer 52a at one of the numerals 1, 2, 3 and 4, one of the images stored in the memory M is selected. If the release button 73 is depressed after the image number is selected, the image identified by the selected image number is displayed on the LCD 52. By operating the DOWN button 72b, the pointer 52a moves downward in FIG. 8, and by operating the UP button 72a, the pointer 52a moves upward in FIG. 8. In the example shown in FIG. 8, if the pointer 52a is located at numeral 5, and the DOWN button 72b is further depressed, the numerals are scrolled up, and further numerals, i.e., 5, 6, . . . , are displayed, if exist, and selected.

When the letter E of the mode selection dial 71 is located at the index 71a, the digital camera 50 operates in the erasure mode. In the erasure mode, similarly to the case where the digital camera 50 is used alone, images stored in the memory M are selected and erased.

When the operation mode of the digital camera 50 is switched to the erasure mode, an image selection screen is displayed similarly to the case where the digital camera 50 operates in the reproduction mode (see FIG. 8). By locating the pointer 52a using the UP button 72a and/or DOWN button 72b, an image stored in the memory M is selected. Then, by depressing the release button 73, the selected image is erased.

Next, a case where the digital camera 50 is coupled to the scanner unit 10, and used as a part of the scanning system 100.

When the letter M of the mode selection dial 71 is located at the index 71a, the scanning system 100 operates in the recording medium selection mode. In the recording medium selection mode, the operator is able to select a recording medium in which the image data is stored.

When the scanning system 100 operates in the recording medium selection mode, similarly to the case where the digital camera 50 is used alone, an image shown in FIG. 7 is displayed on the LCD 52. In this example, one of "CAMERA" or "AUX." can be selected. "CAMERA" represent represents the card memory M inserted in the digital camera 50, and "AUX." represents a recording medium of an auxiliary device such as a computer connected to the scanner unit 10 through the connector 48. By operating the UP button 72a or DOWN button 72b, a pointer 52a is moved to point "CAMERA" or "AUX.", and then by depressing the release button 73, the pointed medium is selected.

When the letter R of the mode selection dial 71 is located at the index 71a, the scanning system 100 operates in the recording mode. In the recording mode, by operating the UP button 72a and the DOWN button 72b, the film holder 20 holding the film 20 is fed to select an image to be scanned (i.e., the image to be scanned should be located at the window 10c. Then, by depressing the release button 73, the selected image is captured, and image data thereof is stored in the recording medium which was determined when the scanning system 100 operates in the recording medium selection mode.

When the letter P of the mode selection dial 71 is located at the index 71a, the scanning system 100 operates in the reproduction (playing) mode. In the reproduction mode, similarly to the case where the digital camera 50 is used alone, an image stored in the image memory M is selected and displayed on the LCD 52.

Specifically, when the scanning system 100 operates in the reproduction mode, an image as shown in FIG. 8 is displayed on the LCD 52. The displayed numerals 1, 2, 3 and 4 each represents an image number of an image stored in the memory M. By locating the pointer 52a at one of the numerals 1, 2, 3 and 4, one of the images stored in the memory M is selected. By operating the DOWN button 72b, the pointer 52a moves downward in FIG. 8, and by operating the UP button 72a, the pointer 52a moves upward in FIG. 8. In the example shown in FIG. 8, if the pointer 52a is located at numeral 5, and the DOWN button 72b is further depressed, the numerals are scrolled up, and further numerals, i.e., 5, 6, . . . , are displayed, if exist, and selected. If the release button 73 is depressed after the image number is selected, the image identified by the selected image number is displayed on the LCD 52.

When the letter E of the mode selection dial 71 is located at the index 71a, the scanner system 100 operates in the erasure mode. In the erasure mode, similarly to the case where the digital camera 50 is used alone, images stored in the memory M are selected and erased.

When the operation mode of the scanner system 100 is switched to the erasure mode, an image selection screen is displayed similarly to the case where the digital camera 50 operates in the erasure mode (see FIG. 8). By locating the pointer 52a using the UP button 72a and/or DOWN button 72b, an image stored in the memory M is selected. Then, by depressing the release button 73, the selected image is erased.

As described above, according to the embodiment, operation of the scanner system 100 is controlled by operating the mode selection dial 71, the UP button 72a, the DOWN button 72b, and the release button 73, all of which are provided to the digital camera 50. It should be noted that functions of the UP button 72a, DOWN button 72b, release button 73 when the scanner system 100 operates in the recording mode are different from those when the digital camera 50 is used alone, detached from the scanner unit 10.

Figure 9:
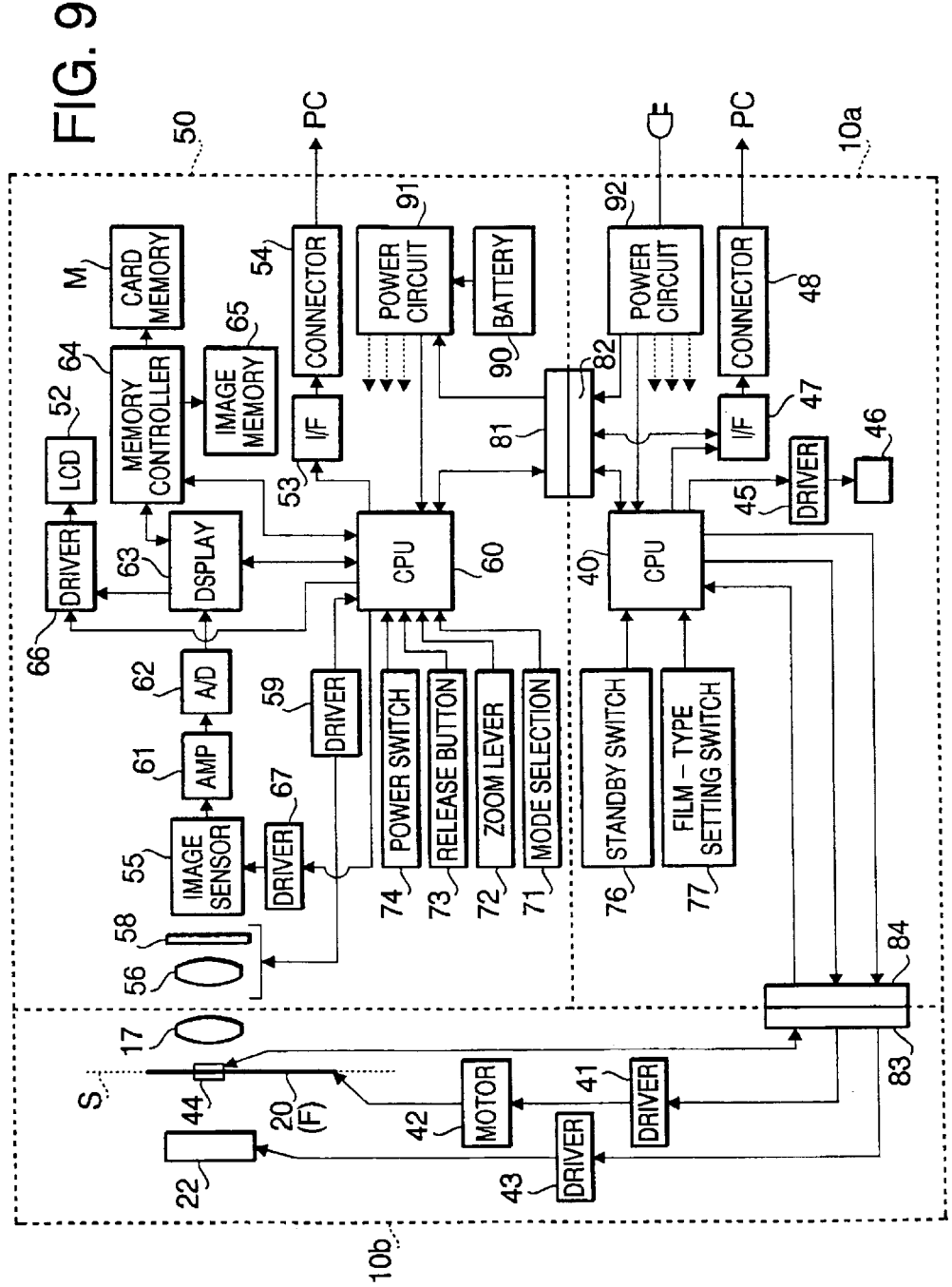
FIG. 9 is a block diagram showing control systems of the digital camera and the scanner unit.

FIG. 9 is a block diagram showing a control system of the scanning system 100.

The original receiving unit 10b has functions of (1) illuminating the film F, and (2) feeding the film F. The control unit 10a has a CPU (Central Processing Unit) 40, and the operation of the original receiving unit 10b is controlled by the control unit 10a in accordance with the operation of the operable buttons of the digital camera 50.

The scanner unit 10 includes a power source 92 for supplying electric power to the entire scanning system 100. The power source 92 is connected to a commercial power source. When the standby switch 76 is operated, the scanning device is brought in condition for scanning an original.

The electrical power is supplied from the power source 92 of the control unit 10a to the digital camera 50 through the connectors 82 and 81. As shown in FIG. 9, the digital camera 50 is provided with a battery 90 and a power circuit 91. However, when the digital camera 50 is used together with the scanner unit 10, a power switch 74 of the digital camera 50 need not be turned ON. On the other hand, when the digital camera 50 is used alone, the power switch 74 should be turned ON so that the digital camera 50 operates using the electrical power supplied from the battery 90.

The control unit 10a and the original receiving unit 10b are electrically connected with the connectors 83 and 84. Further, the control unit 10a and the digital camera 50 are electrically connected with the connectors 81 and 82. When the mode selection dial 71, the UP button 72a, the DOWN button 72b, or the release button 73 is operated, a CPU 60 of the digital camera 50 transmits commands corresponding to the operated dial/button to the CPU 40 of the control unit 10a. Then, the CPU 40 controls the operation of the scanning system 100. It should be noted that, the operation of the digital camera 50 when used alone (i.e., detached from the scanner unit 10) is controlled by the CPU 60.

The scanner unit 10 is provided with a film detection unit 44 for detecting whether a film F is loaded. The film detection unit 44 is, for example, a transmission-type photo-interrupter arranged at a film holder feeding path S. The photo-interrupter has a light emitting element and light receiving element with the holder feed path S located therebetween. When the film holder 20 is not located at the position where the photo-interrupter is arranged, light emitted by the light emitting element is directly incident on the light receiving element. If the film holder 20 is located at the position where the photo-interrupter is arranged, light emitted by the light emitting element is shielded by the holder 20 and does not reach the light receiving element. Thus, the presence of the film holder 20 is detected.

The CPU 40 detects whether the digital camera 50 is connected to the control unit 10a. Specifically, when the connector 82 of the control unit 10a is connected to the connector 81 of the digital camera 50, a logical high (H) signal is transmitted, through a predetermined terminal of the connector 81 and a corresponding terminal of the connector 82 of the control unit 10a, to the CPU 40. The CPU 40 detects the logical high (H), and determines that the digital camera 50 is mounted on the scanner unit 10, and electrically connected to the control unit 10a. Then, the CPU 40 transmits a predetermined signal to the CPU 60. The CPU 60, upon receipt of the signal from the CPU 40, start communicating with the CPU 40.

The three color LED's of the indicator 46 are selectively driven by an LED driver 45 to emit light based on whether the film F is loaded and whether the digital camera 50 is mounted on the scanner unit 10.

Hereinafter, operation of the scanning system 100 will be described.

The film holder 20 is moved in a direction indicated by arrow A in FIG. 2, by a motor 42. On a rear side with respect to the film holder 20, a fluorescent lamp 22 having a flat light emitting surface is provided. Turning ON and OFF of the fluorescent lamp 22 is controlled by a light source driver 43.

On the digital camera side with respect to the film holder 20, a close-up lens 17 is provided so that the images of the film, which is located relatively close to the digital camera 50, can be captured at appropriate magnification. The optical axis of the close-up lens 17 coincides with the optical axis of the photographing lens 56, the center of the aperture stop 58 and the image sensor 55.

The CPU 60 moves the photographing lens (which is a zoom lens) to an appropriate position in accordance with the type of the film to be scanned. Further, the CPU 60 drives the aperture stop 58, and brings the image formed on the image sensor 55 to in-focus condition. The image sensor 55 is driven by a sensor drive circuit 67 to accumulate electric charges and output image signal representing the received image.

When the recording mode is selected as an operation mode of the scanner system 100 with the mode selection dial 71, a type of the film F, which is set by a film type setting switch, is detected, and then, the photographing lens is moved to an appropriate position corresponding to the detected type of film, Thereafter, the light source 22 is turned ON. Then, the film holder 20 is fed to its initial position, and then, the aperture stop 58 is adjusted, and an image formed on the image sensor 55 is brought into in-focus condition.

A frame of image to be scanned is selected by moving the film holder 20 with the UP button 72a or DOWN button 72b. Then, the selected image is captured and the image data is stored by depressing the release button 73.

The image capturing operation will be described in detail hereinafter.

The light emitted by the light source 22 illuminates a frame of image on the film F located at the opening 10c from behind. The light then refracted by the close-up lens 17, which is fitted in the opening 10c, and is incident on the photographing lens 56 of the digital camera 50. The light incident on the photographing lens 56 passes through the aperture stop 58, and forms an optical image on the image sensor 55. The image sensor 55 converts the received optical image into an electrical image (i.e., outputs the image signal), which is amplified by an amplifier 61 and converted into a digital image signal by a A/D (Analog to Digital) converter 62. The digital image signal is transmitted to a DSP (Digital Signal Processing) circuit 62 where a shading correction, interpolate compensation, and the like are applied to the received digital image signal. The processed digital image signal is temporarily stored in an image memory 65 via memory controller 64.

If the card memory M is selected as a recording medium for storing the image data, the image data stored in the image memory 65 is transmitted to the card memory M by the memory controller 64.

If the auxiliary recording medium is selected as a recording medium for storing the image data, the image data stored in the image memory 65 is transmitted to an interface (I/F) circuit 47 via the CPU 60 and CPU 40, at which the image data is converted to a signal having a predetermined format, and output to an auxiliary device through the connector 48.

When the operation mode of the scanner system 100 is switched to a reproduction mode, the image data stored in the card memory M is selected with the UP button 72a or DOWN button 72b. When the release button 73 is depressed, the selected image data is read out of the card memory M, converted into an analog video signal suitable to the LCD 52 by the DSP circuit 63. The image signal is further processed such that a color adjustment, an outline enhancement and the like are applied. The LCD drive circuit 66 display an image based on the processed image signal.

It may be possible to display a currently selected mode and/or various information on the LCD 52 as well as the image.

When the operation mode of the scanner system 100 is switched to the erasure mode, the image data stored in the card memory M is selected with the UP button 72a and/or DOWN button 72b. When the release button 73 is depressed, the selected image data is erased.

As described above, when the digital camera 50 is used alone, the operation of the digital camera 50 is controlled by the CPU 60. If the operation mode of the digital camera 50 is the reproduction mode or the erasure mode, the operation of the digital camera 50 is similar to the operation when the digital camera 50 is coupled to the scanner unit 10 and functions as a part of the scanner system 100.

If the operation mode of the digital camera 100 is the recording mode, when the release button 73 is depressed, an image of the object is captured by the image sensor 55, and the digital image signal corresponding to the object image is stored in a recording medium that is selected in the recording medium selection mode. If the selected recording medium is the card memory M, the image data is stored in the card memory M, similarly to the data storing operation of the scanning system 100. If the selected recording medium is an auxiliary recording medium, and an auxiliary device such as a computer is connected to the connector 54, the image data is read out of the image memory 65 is converted into an image signal having a predetermined format suitable to the connected device by the CPU 60 and the I/F circuit 53, and transmitted to the auxiliary device through the connector 54.

Figure 10:
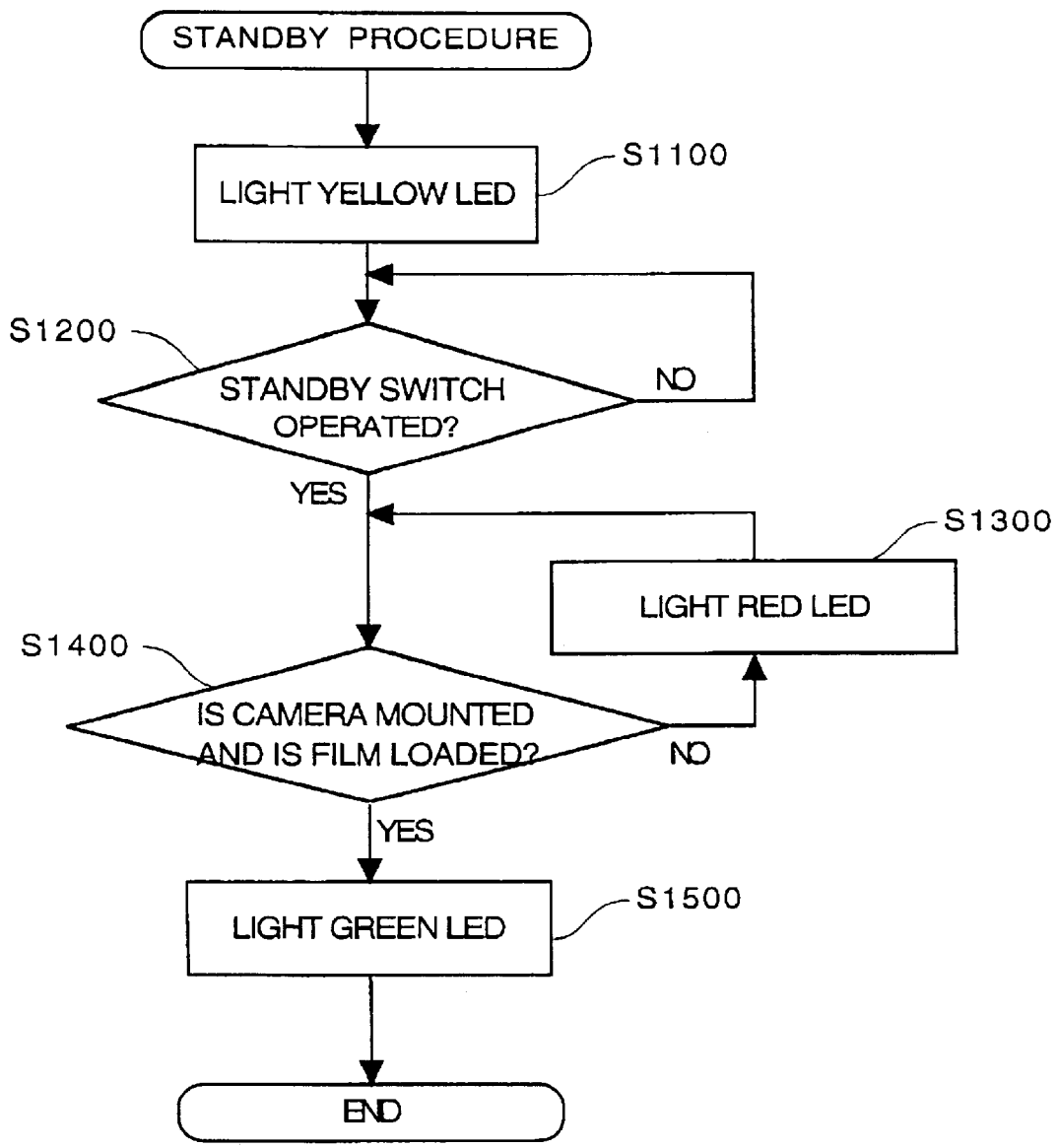
FIG. 10 is a flowchart illustrating a standby procedure of the scanning system.
Figure 11:
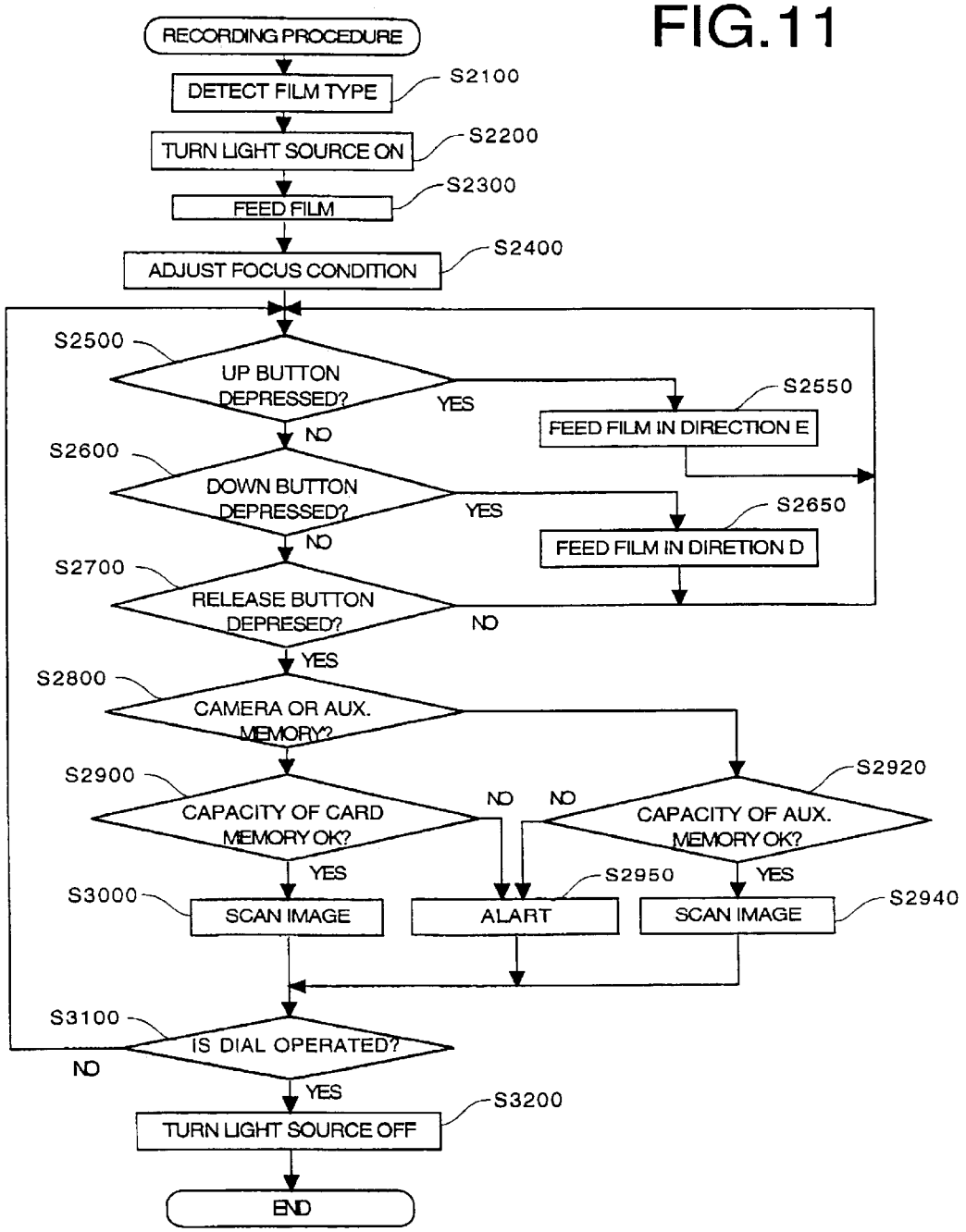
FIG. 11 is a flowchart illustrating a recording procedure of the scanning system.

FIG. 10 is a flowchart illustrating a standby procedure, and FIG. 11 is a flowchart illustrating a recording procedure of the scanning system 100 which is executed when the recording mode is selected.

The standby procedure is executed by the CPU 40. Firstly, when the power source 92 is connected to the commercial power source, the yellow LED of the indicator 46 is lit (S1100). That is, if the indicator 46 is lit in yellow, the scanner system 100 is ready to operate.

In S1200, it is judged whether the standby switch 76 is operated. If the standby switch is not operated (S1200: NO), then control repeats step S1200. If the standby switch 76 is operated (S1200: YES), then it is judged, in S1400, whether the digital camera 50 is coupled to the scanner unit 10 and the film holder 20 is inserted in the opening 10d. If the digital camera 50 is not mounted on the scanner unit 10 and/or the film holder 20 is not inserted in the opening 10d (S1400: NO), the yellow LED of the indicator 46 is turned OFF and the red LED of the indicator 46 is turned ON. That is, if the indicator 46 is lit in red, at least one of the digital camera and the film F is not ready.

If both the digital camera 50 and the film F is ready (S1400: YES), control proceeds to S1500, where the red LED of the indicator 46 is turned OFF, and a green LED of the indicator is turned ON. That is, when the indicator 46 is lit in green, the scanning operation can be performed immediately.

After the green LED of the indicator 46 is turned ON, the standby procedure is terminated.

When the indicator 46 is lit in green, i.e., when the scanner system 100 is ready to scan the film F, by turning the mode selection dial 71 to select an operation mode, a procedure corresponding to the selected operation mode is initiated.

When the selected operation mode is the recording medium selecting mode, the reproduction mode, or the erase mode, the procedure of the scanner system 100 is similar to the procedure of the digital camera 50 when used alone, and accordingly, description there of will be omitted.

Figure 12A:
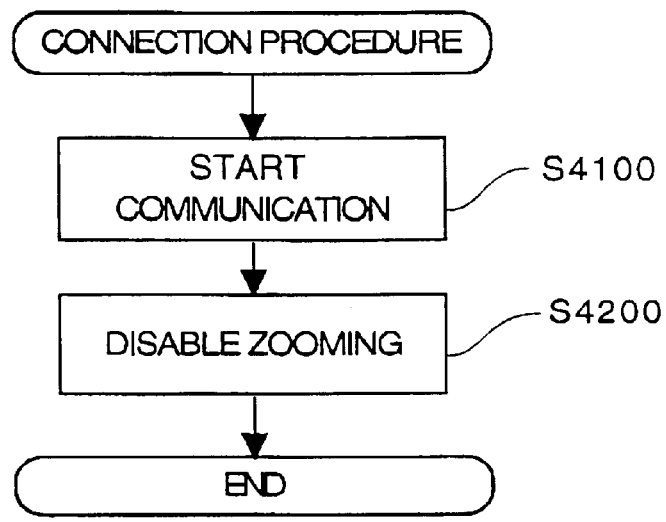
FIG. 12A is a flowchart illustrating a connection procedure.

FIG. 12A is a flowchart illustrating a connection procedure executed by the CPU 60 of the digital camera 50 when the digital camera 50 is connected to the scanner unit 10. When the digital camera 50 is connected to the scanner unit 10, the predetermined signal is transmitted from the CPU 40, and in response to the predetermined signal, the CPU 60 starts communicating with the CPU 40 (S4100). Then, in S4200, the CPU 60 disables a zooming operation which is normally executed (i.e., executed when the digital camera is used alone) upon operation of the UP button 72a and/or the DOWN button 72b.

When the selected operation mode is the recording mode, the procedure shown in FIG. 11 is executed. It should emphasized that when the digital camera 50 is coupled to the scanner unit 10 and functions as a part thereof, the CPU 40 and the CPU 60 communicate with each other as described above. In particular, when the recording mode is selected, the zooming function executed in response to operation of the UP button 72a and the DOWN button 72b is disabled, and information regarding the operation of the UP button 72a, DOWN button 72b, release switch 73 is transmitted from the CPU 60 to the CPU 40, and the operation of the entire scanning system 100 is controlled by the CPU 40.

In S2100, a type of the film F is detected. When a film F is loaded in the scanner unit 10, the film type setting switch 77 is operated. Accordingly, by detecting the status of the film type setting switch 77, the type of the film F is detected. Then, based on the type of the film F, the CPU 40 controls, via the CPU 60, the driver 59 to move the photographing lens 56 to a position where a frame of the image formed on the detected type of the film F can be captured at an appropriate magnification.

In S2200, the light source 22 is turned ON by the light source driving circuit 43. Then, in S2300, the film holder 20 is fed so that the holder 20 is located to the initial position. The initial position is a position at which a first frame of the film F faces the photographing lens 56 of the digital camera 50. In other words, the initial position is a position at which the first frame is located at an image reading area of the scanner system 100.

In S2400, the aperture stop 58 is adjusted, and the focusing condition on the image receiving surface of the image sensor 55 is adjusted.

In S2500, it is judged whether the UP button 72a is depressed. If the UP button 72a is depressed (S2500: YES), the CPU 40 controls the motor drive circuit 41 to drive the motor 42 to move the film holder 20 in direction E so that a subsequent frame is located at the image reading area of the scanner system 100. Then, control goes back to S2500.

If the UP button 72a is not depressed (S2500: NO), then it is judged whether the DOWN button 72b is depressed, in S2600. If the DOWN button 72b is depressed (S2600: YES), the CPU 40 controls the motor drive circuit 41 to drive the motor 42 to move the film holder 20 in direction D so that a previous frame is located at the image reading area of the scanner system 100. Then, control goes back to S2500.

If the UP button 72a is not depressed (S2500: NO) and the DOWN button 72b is not depressed (S2600: NO), then it is judged whether the release button 73 is depressed in S2700. If the release button 73 is not depressed (S2700: NO), control goes back to S2500. If the release button 73 is depressed (S2700: YES), i.e., when an image to be scanned is located at the image reading area, and the recording is to be started, the recording medium to be used for storing the image data is detected in S2800. If the card memory M is selected as the recording medium, control goes to S2900 where it is judged whether the remaining capacity of the card memory M is greater than the size of one frame of the image data.

If the remaining capacity is less than the size of the image data (S2900: NO), control proceeds to S2950. In S2950, the CPU 40 controls, via the CPU 60 of the digital camera 50, the LCD drive circuit 66 to display a warning message indicating the remaining capacity is insufficient, and the control goes to S3100 to turn OFF the light source 22.

If the remaining capacity is greater than the size of the image data (S2900: YES), control goes to S3000 where the image on the film F is scanned, and the image data is stored in the card memory M. After the image data is stored in the card memory M, control goes to S3100 and the light source 22 is turned OFF.

In S2800, if the auxiliary recording medium is selected as the recording medium, control goes to S2920 where it is judged whether the remaining capacity of the auxiliary recording medium is greater than the size of one frame of the image data.

If the remaining capacity is less than the size of the image data (S2920: NO), control proceeds to S2950, and the warding message is displayed on the LCD 22. Then, the control goes to S3100 to turn OFF the light source 22.

If the remaining capacity of the auxiliary recording medium is greater than the size of the image data (S2920: YES), control goes to S2940 where the image on the film F is scanned, and the image data is stored in the auxiliary recording medium. After the image data is stored in the auxiliary recording medium, control goes to S3100.

In S3100, it is judged whether the mode selection dial 71 is operated. If the mode selection dial 71 has not been operated (S3100: NO), which means the operator intends to scan another image, control goes to S2500. If the mode selection dial 71 has been operated, and the operation modes of the scanner system 100 has been changed a mode other than the recording mode, the light source 22 is turned OFF.

Figure 12B:
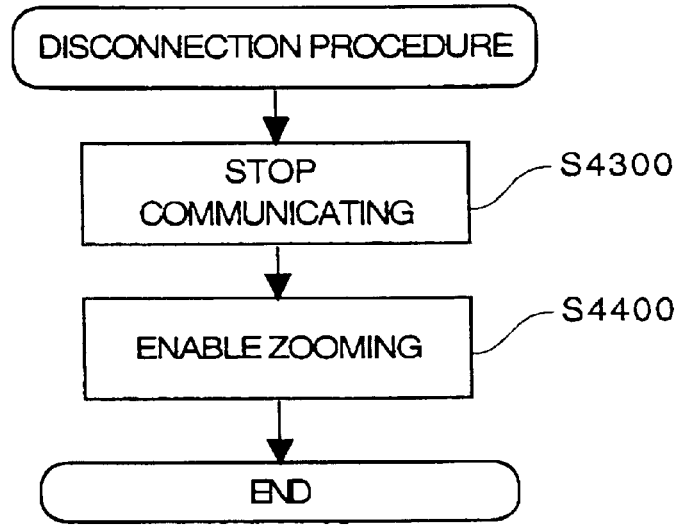
FIG. 12B is a flowchart illustrating a disconnection procedure.

FIG. 12B is a flowchart illustrating a disconnection procedure which is executed by the CPU 60 of the digital camera 50 when the digital camera 50 coupled to the scanner unit 10 is detached.

In S4300, as the connection between the CPU 40 and the CPU 60 is lost, the communication operation of the CPU 60 is stopped. Then, in S4400, the zooming operation in response to the operation of the UP button 72a and/or the DOWN button 72b is enabled.

As described above, when the scanner system 100 operates in the recording mode, the recording procedure is performed by operating the UP switch 72a, the DOWN switch 72b, and the image data is recorded.

As described above, according to the embodiment, the digital camera 50 having the image sensor 55 is detachably coupled to the scanner and the image sensor 55 is used for scanning the image on the film F. Since the image sensor 55 is used, relative movement of the image sensor 20 and the film F is unnecessary, and therefore scanning of the image can be performed quickly. In other words, by coupling the digital camera 50 to the scanner unit 10, the digital camera 50 can be used as a image capturing unit of the scanning system 100.

Further, the mode selection dial 71, the UP button 72a, the DOWN button 72b of the digital camera 50 are used for controlling the operation of the scanning system. Accordingly, the number of operable members of the scanner unit 10 can be reduced, which reduces a manufacturing cost, and further, the scanner unit 10 may be made relatively light in weight.

It should be noted that, the mode selection dial 71, the UP button 72a, the DOWN button 72b are assigned with functions different from those when the digital camera 50 is used alone. Accordingly, the camera is not provided with operable members that are used only when the digital camera is coupled to the scanner unit 10.

The present disclosure relates to subject matter contained in Japanese Patent Application No. HEI 10-191292, filed on Jul. 7, 1998, the disclosure of which is expressly incorporated by reference herein in its entirety.

What is claimed is:

1. A film scanning system for scanning an image formed on a film, comprising:
   a digital camera having an image sensor that captures an image of an object; and
   a scanner unit that is coupled with said digital camera when an image of the film is captured, the scanner unit having an original receiving portion,
   wherein, when the film is located at said original receiving portion, said image sensor of said digital camera captures an image formed on the film, and
   wherein said scanner unit is provided with a close-up lens to be located between the film and a photographing optical system of said digital camera.

2. A film scanning system for scanning an image formed on a film, comprising:
   a digital camera including:
      an image sensor that captures an image;
      a plurality of operable members; and
      a first controller that controls said digital camera in accordance with an operation of said plurality of operable members; and
   a scanner unit including:
      an illuminating system that illuminates an original located at an image reading area of said scanner unit;
      a feeding system that feeds the original to locate a desired one of a plurality of images formed on the original at said image reading area; and
      a second controller that controls said illuminating system and said feeding system,
   said scanner unit being coupled with said digital camera when an image on the original is captured,
   wherein when said digital camera is coupled to said scanner unit, said first controller and said second controller communicate with each other so that said second controller controls said illuminating system and said feeding system in accordance with an operation of said plurality of operable members of said digital camera.

3. The film scanning system according to claim 2, wherein said scanner unit further comprises:
   an original detector that detects whether an original is loaded in said scanner unit;
   a camera detector that detects whether said digital camera is electrically coupled to said scanner unit; and
   an indicating system that indicates whether the original is loaded and said digital camera is electrically connected to said scanner unit.

4. The scanning system according to claim 3, wherein the original comprises a film held by a film holder.

* * * * *